United States Patent [19]

Hammond, Jr.

[11] Patent Number: 5,242,088
[45] Date of Patent: Sep. 7, 1993

[54] APPARATUS DETACHABLY ATTACHABLE TO FISHING POLES FOR HOLDING AND DISPENSING SEMI-LIQUIDS

[76] Inventor: Rockwell Hammond, Jr., P.O. Box 396, Fall City, Wash. 98024

[21] Appl. No.: 985,863

[22] Filed: Dec. 4, 1992

[51] Int. Cl.⁵ .............................................. B67D 5/64
[52] U.S. Cl. .................................... 222/174; 222/105; 222/192; 43/25.2
[58] Field of Search ................. 222/174, 192, 92, 105, 222/215, 541; 43/25, 25.2, 54.1

[56] References Cited

U.S. PATENT DOCUMENTS

| | | | |
|---|---|---|---|
| 2,225,438 | 12/1940 | Sitek | 43/25.2 |
| 2,702,960 | 3/1955 | Weaver | 43/25.2 |
| 2,720,422 | 10/1955 | Mercur | 222/174 |
| 3,254,804 | 6/1966 | Grant | 222/174 X |
| 4,831,772 | 5/1989 | Gillespie | 43/25 X |

Primary Examiner—Gregory L. Huson
Attorney, Agent, or Firm—Robert W. Jenny

[57] ABSTRACT

The apparatus comprises a base, a pliable container of semi-liquid and two clips. The clips snap onto the base and are configured to hold the container onto the base and the base and container onto a fishing pole. The container has an outlet located over a flat surface on the base onto which the semi-liquid may be dispensed by pressing on the container and the dispensed material is then readily available for its intended use(s).

2 Claims, 1 Drawing Sheet

APPARATUS DETACHABLY ATTACHABLE TO FISHING POLES FOR HOLDING AND DISPENSING SEMI-LIQUIDS

BACKGROUND OF THE INVENTION

1. Field

The subject invention is in the fields of containers for semi-liquids such as adhesives, lubricants, ointments and the like and apparatus for holding such containers so that only one hand is required for applying pressure to the container to dispense the semi-liquid substance. Specifically, the invention is in such fields related to fishing with rods and reels.

2. Prior Art

There is no patented prior art to the subject invention known to the inventor and non patented prior art appears to be limited. Soap dispensers mounted in public lavatories and grease cups on machinery are two examples of containers mounted such that their contents can be dispensed with one hand. No such apparatus which is known which is easily mounted and dismounted such as on a fishing pole. In current practice the semi-liquids are supplied in various kinds of containers such as tubes, jars and cans which are stored and carried in a pocket or creel, making their use inconvenient in terms of interruption of the fishing and also in terms of taxing the user's dexterity as the container is removed from the storage space, opened, material removed and applied, and the container closed and replaced, all while managing a fishing pole.

Accordingly, the primary objective of the subject invention is to provide apparatus detachably attachable to a fishing pole for holding a container of semi-liquid readily accessible for accurate dispensing of the semi-liquid onto a surface from which the semi-liquid can be removed for use on fishing gear. Other objectives are that the apparatus be adaptable to a range of fishpole diameters and configurations, easy to use and inexpensive.

SUMMARY OF THE INVENTION

The subject invention in apparatus which holds a pliable container of semi-liquid and is detachably attachable to a fishing pole. The semi-liquid is dispensed onto a surface on the apparatus by applying finger pressure to the container and can be retrieved from the surface for application to fishing gear, such as applying the semi-liquid to a fishing lure. The apparatus comprises a base, the container and two clips, the clips serving to hold the container onto the base and the base and container onto the cylindrical shaft of a fishing pole. The container is notched to provide and exit hole for the semi-liquid and the notch is located on a flat surface on the base so that it can be transferred from the surface to fishing gear. The base is essentially flat and rectangular. Flanges extend from one of the flat sides of the base near its ends and are notched to align the base on the pole. The long edges of the base are notched to accept the clips and locate them near the ends of the base. The clips clamp the container near its end to the base and extend beyond the base to close around the pole to hold the apparatus in place.

The invention is described in more detail below with reference to the attached drawings.

DETAILED DESCRIPTION OF THE INVENTION

Figure 1:
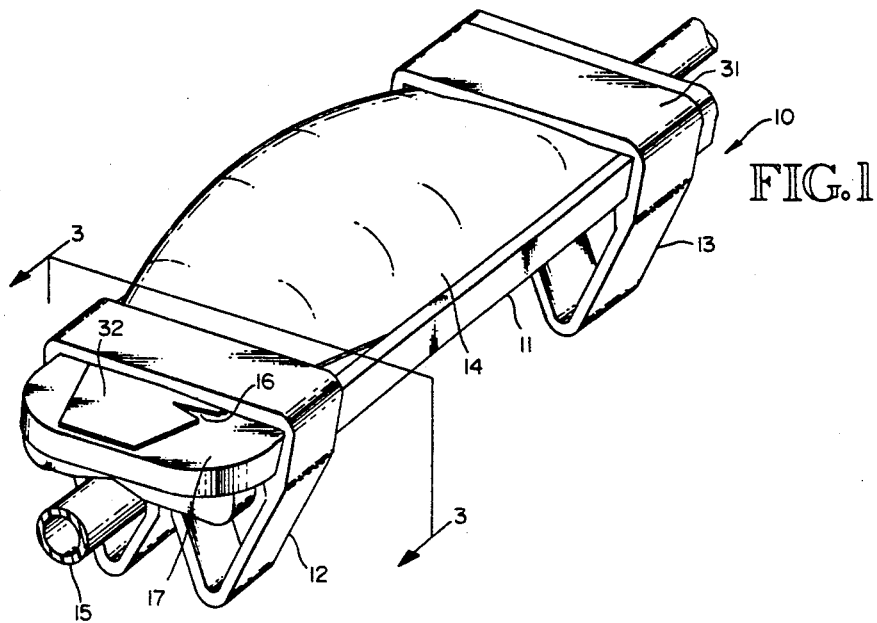
FIG. 1 is an isometric view of the apparatus installed on a segment of a fishing pole.

The subject invention is apparatus detachably attachable to fishing poles for holding and dispensing semi-liquids. As shown in FIG. 1, the apparatus 10 comprises a base 11, clips 12 and 13 and a container 14 of semi-liquid, attached to fishing pole segment 15. Notch 16 in the container provides an outlet for the semi-liquid from the container onto surface 17 of the base for retrieval for use on other fishing apparatus.

Figure 3:
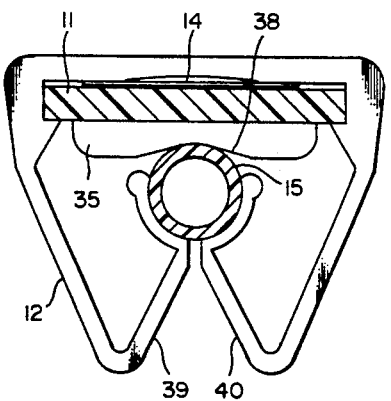
FIG. 3 is a section taken at 3—3 in FIG. 1.
Figure 2:
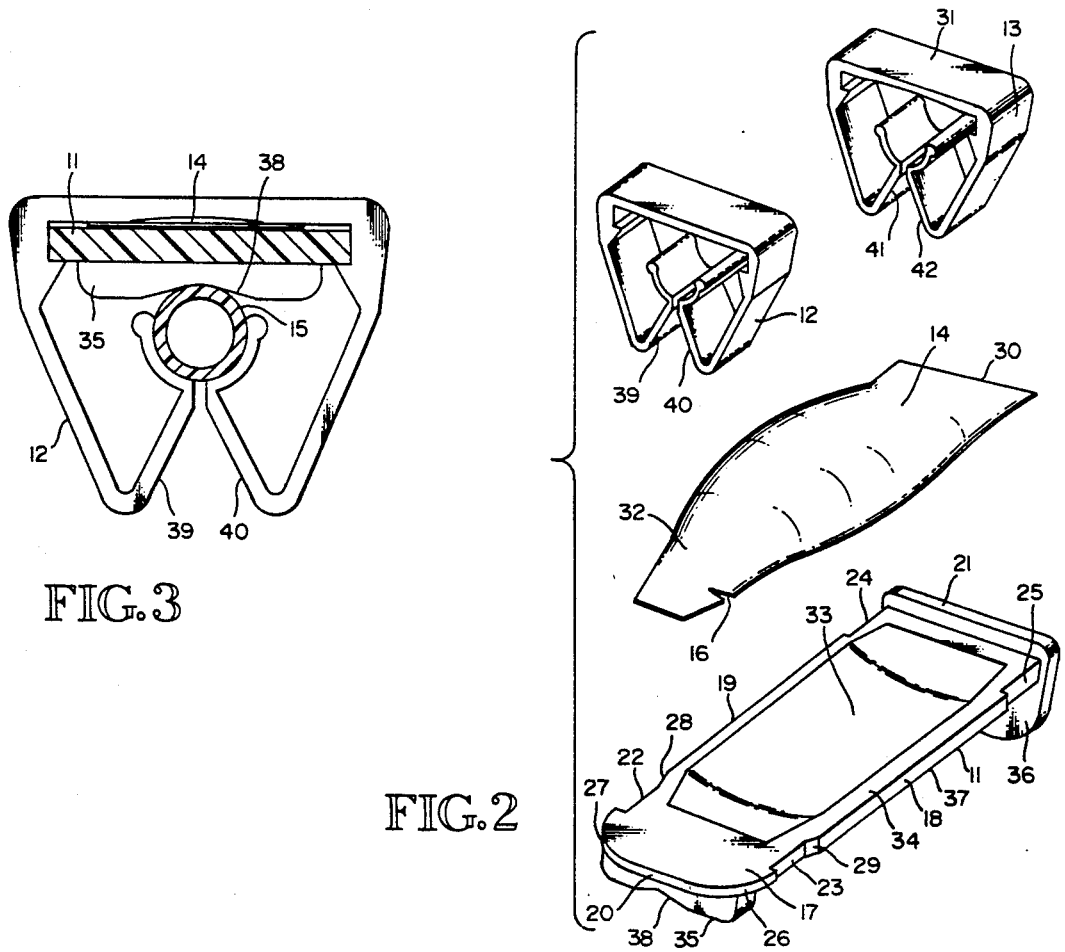
FIG. 2 is an exploded isometric view of the apparatus.

FIG. 2 is an exploded view of the apparatus with the parts already numbered so marked. Edges 18 and 19 of the base are notched near ends 20 and 21, with notches 22 and 23 near end 20 and notches 24 and 25 near end 21. The clips are slid onto the base from end 20 and snap into the notches. Ramps 26, 27, 28 and 29 facilitate sliding the clips into place. Clip 13 is slid into place first. End 30 of the container is then slipped between flat portion 31 of the clip and clip 12 is slid into place over end 32 of the container, leaving notch 16 exposed. Cavity 33 in slide 34 of the base accepts the container and helps hold it in place. Flanges 35 and 36 extend normal to side 37 of the base and are notched, notch 38 being visible. Engagement of the notches on the pole segment align the base on the pole segment (see FIG. 1). The apparatus is installed on the pole segment by placing portions 39 and 40 of clip 12 and 41 and 42 of clip 13 against the pole segment and applying force on the base toward the pole segment to cause the portions to spread apart, pass over the segment and snap inwardly to contact the segment, pushing it into the notches in the flanges. This attachment is illustrated in FIG. 3, a sectional view taken at 3—3 in FIG. 1 with items numbered as in FIGS. 1 and 2.

It is considered to be understandable from this description that the invention meets its objectives. It provides apparatus detachably attachable to a fishing pole for holding a container of semi-liquid readily accessible for accurate dispensing of the semi-liquid onto a surface from which the dispensed material can be removed for use on fishing gear. It is adaptable to a range of fishing pole diameters and is easy to use as well as inexpensive because of its simplicity.

It is also considered to be understood that while one embodiment of the invention is described herein, other embodiments and modifications of the one described are possible within the scope of the invention which is limited only by the attached claims.

I claim:

1. Apparatus detachably attachable to a fishing pole for holding and dispensing semi-liquid, said apparatus comprising:
   a base,
   a container made of pliable material and containing semi-liquid, said container having an outlet, whereby semi-liquid is dispensed through said outlet,
   means for detachably attaching said container to said base and said base and said container to said pole,
   said base further comprising a surface for receiving dispensed semi-liquid and in which said outlet is positioned over said surface.

2. The apparatus of claim 1 in which said means for detachably attaching comprises at least one clip.

* * * * *